Sept. 11, 1928. 1,683,979
A. G. F. KUROWSKI
COMBINED TYPEWRITING AND CARD PERFORATING MACHINE
Filed Aug. 7, 1925 6 Sheets-Sheet 2

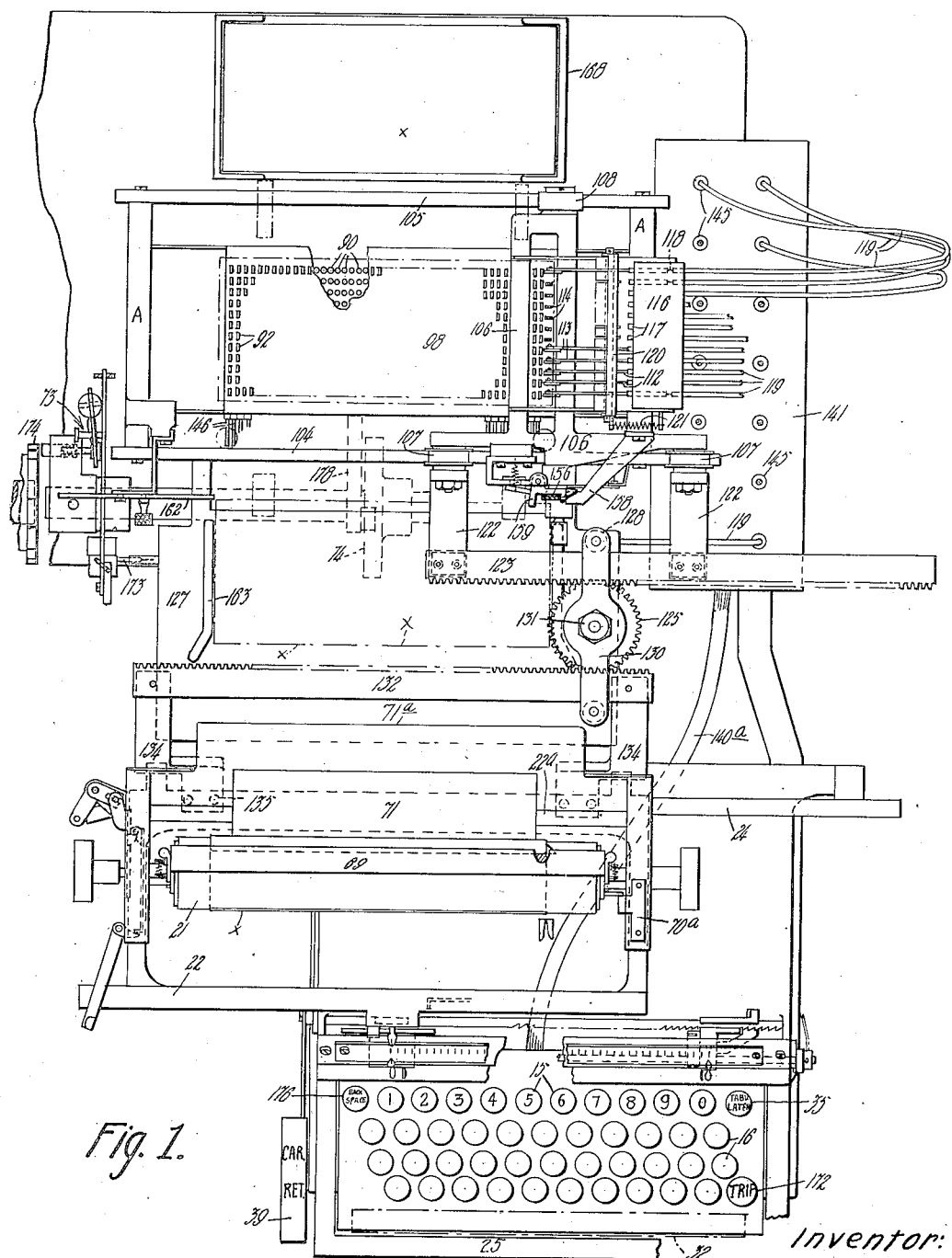

Inventor.
Alfred G. F. Kurowski
by B. C. Stickney
Attorney

Sept. 11, 1928. 1,683,979
A. G. F. KUROWSKI
COMBINED TYPEWRITING AND CARD PERFORATING MACHINE
Filed Aug. 7, 1925   6 Sheets-Sheet 3

Inventor
Alfred G. F. Kurowski
by B. C. Stickney
Attorney

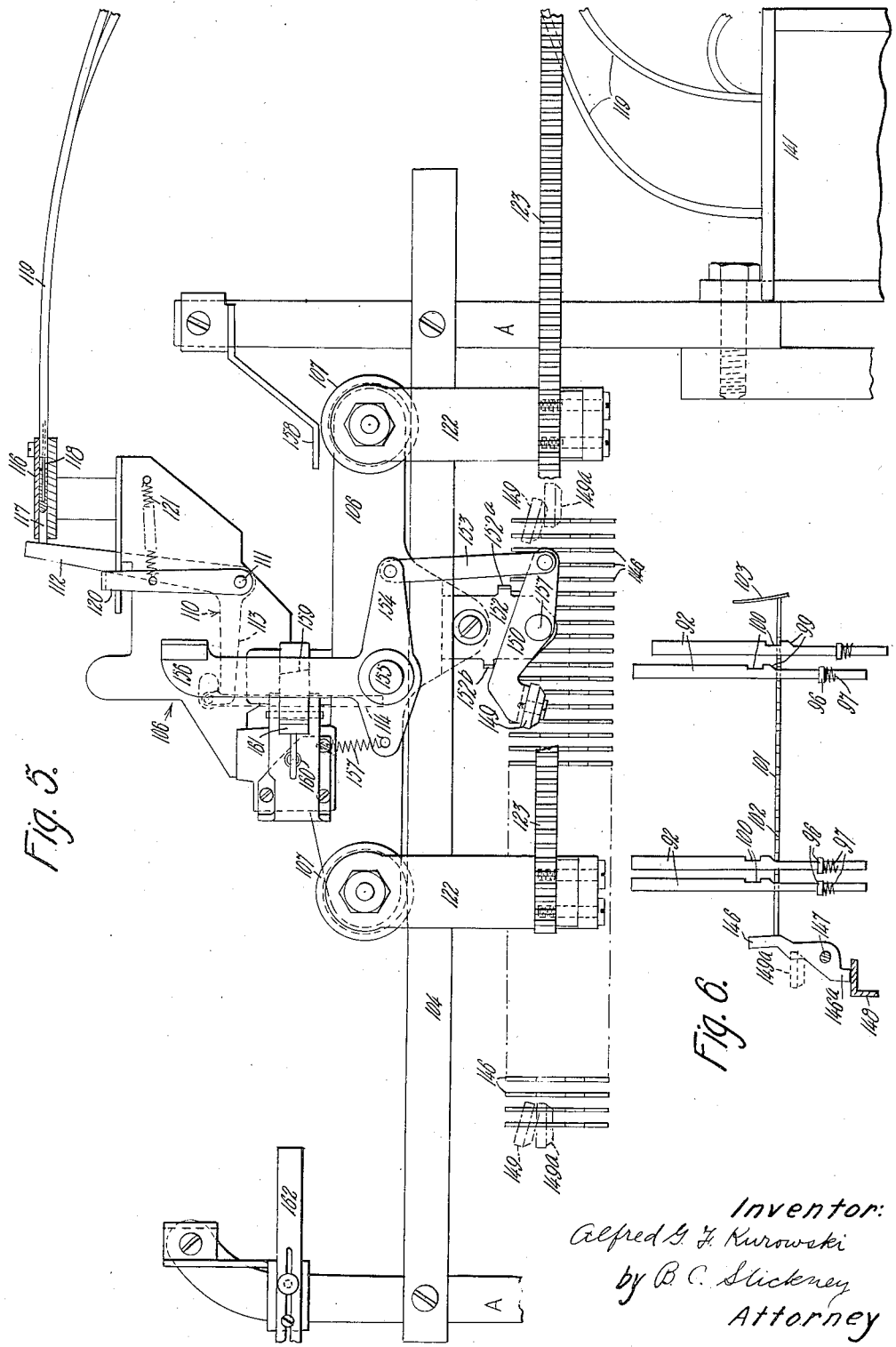

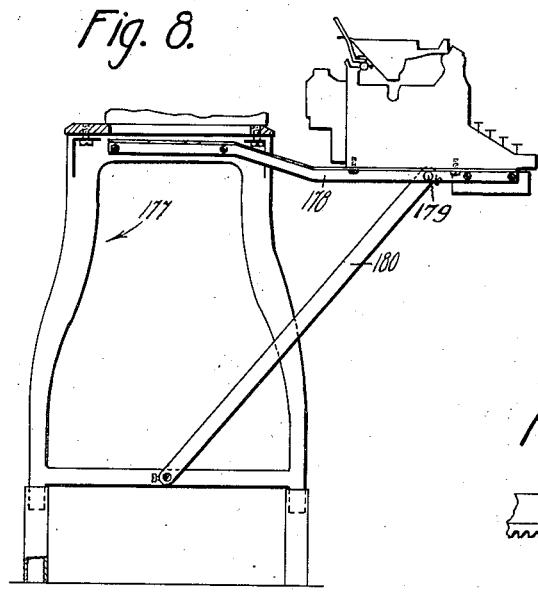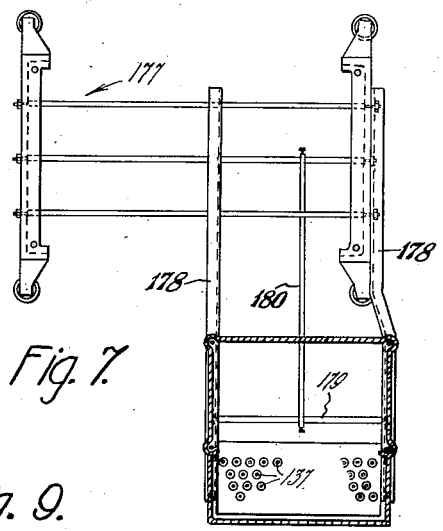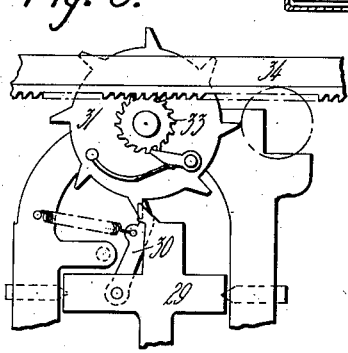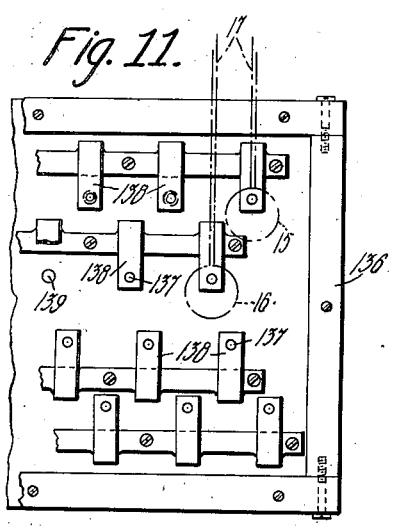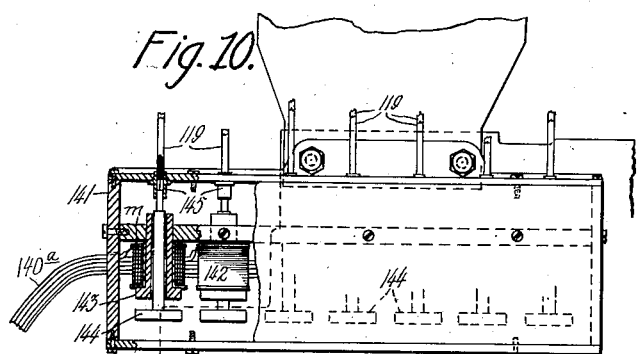

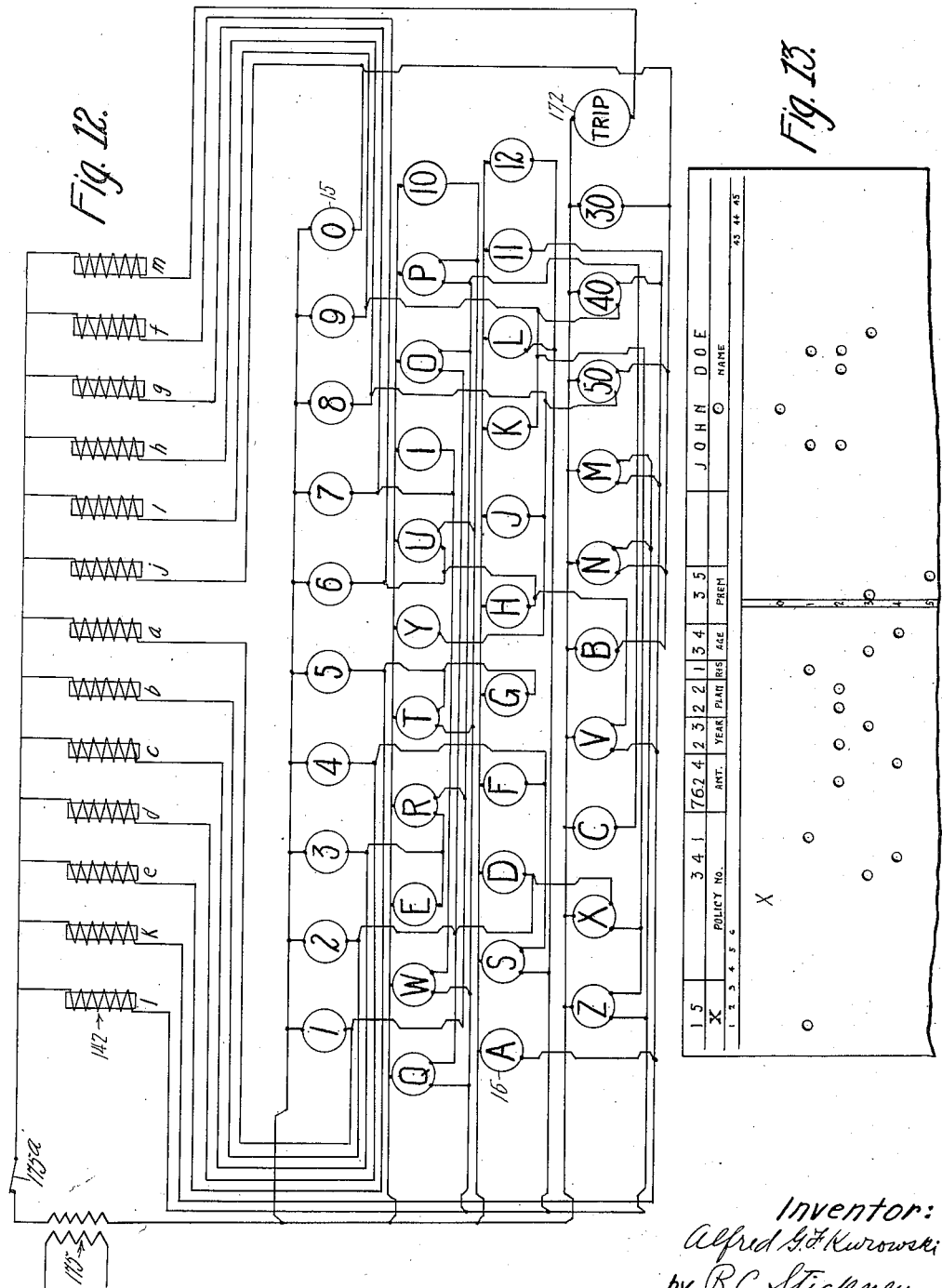

Patented Sept. 11, 1928.

1,683,979

UNITED STATES PATENT OFFICE.

ALFRED G. F. KUROWSKI, OF BROOKLYN, NEW YORK, ASSIGNOR TO UNDERWOOD ELLIOTT FISHER COMPANY, OF NEW YORK, N. Y., A CORPORATION OF DELAWARE.

COMBINED TYPEWRITING AND CARD-PERFORATING MACHINE.

Application filed August 7, 1925. Serial No. 48,723.

This invention relates to a combined typewriting and card-perforating machine where an Underwood typewriter is mechanically coupled to a modified Powers card-perforating machine, whereby the manipulation of either alphabet or numeral keys of the typewriter types a visual record upon a card and simultaneously sets up index-pins to the card-perforating elements singly, or, in plural combinations, that subsequently are employed to operate punches that punch the card with holes that are descriptive of the items typed.

Heretofore a combination machine of this character included the two machine elements joined by an electric cable, and the typewriter in typing an item simultaneously closed electric circuits to an electro-magnetic-controlled perforating machine. This electro-magnetic control included only the numeral and space key transmissions, and each machine required individual manual operations to restore the carriages to an initial starting point for a new line entry, and further required individual carriage-feeding elements that synchronized through electro-magnetic action, and hence the carriage of the typewriter, during the typing of an item, or the index-pin-setting carriage of the perforating machine, might, unnoticed by the operative, be accidentally shifted to disturb the letter-space timing between the two carriages, and, while the typed entry on the card might be correct, the perforating might be incorrectly registered relative to the entry typed, and the perforated card would be worthless as a means to subsequently reproduce the typed items in columnar or denominational values.

One feature of the present invention provides for the elimination of the carriage-feeding elements from the index-pin-setting carriage of the perforating machine, by positively connecting said carriage to the typewriter carriage by mechanical means, and both carriages controlled by the step by step feeding mechanism of the typewriter. This single control of both carriages provides that the operative can move both carriages back and forth in the usual manner, at will, in perfect timing with each other; a feature that is particularly valuable where a correction is to be made in the card before it is removed from the typewriter, and is essential to promote a perfect harmony between the typing and perforating elements.

Prior to the present invention, both the typewriting and perforating machines had individual column-stops that were individually adjusted to each machine for a similar scale-reading. A tabulator-key at the keyboard controlled both tabulating mechanisms, but no attempt was made for tabulating denominationally.

The present method of positively controlling the perforating machine carriage in perfect unison with the typewriter carriage enables the operative to employ the tabulator-key in the usual manner, to release and arrest the carriages at a decimal columnar position predetermined by the column-stop, and by the use of the back-space key both carriages may be back-spaced in the usual manner for tabulating denominationally in dollars and cents. Thus a card may be typed and punched for an entry in dollars and cents, and this denominational piercing of the card may subsequently be translated and the value run into a totalizer in perfect denominational order.

In prior mechanisms, the indexing pins were set up when the carriage moved step by step in one direction, and the indexing carriage was restored in the opposite direction by a hand-manipulated carriage-restoring lever, said lever having a movement relative to the carriage that shifted and thereby made effective suitable means to restore all the set-up pins to normal positions.

The present invention aims to provide for an automatic shifting of the same or other pin-restoring means carried by the index-pin-setting carriage, said shifting being preferably accomplished by the carriage movement as the carriage encounters an adjustable stop at the end of the line of print. In this manner the pin-clearing device becomes operative during the return movement of the index-carriage, and, at the end of the return movement of the carriage, a fixed stop automatically restores the pin-clearing device to its normal or inoperative position. Thus the pin-clearing operation that heretofore has been accomplished by a manual operation is now automatically accomplished by the power-driven carriage-returning movement, and relieves the operative of all responsibility of properly clearing a set-up form of indexing pins after each card-typing operation.

Another feature provides that the disposition of the two carriages is such that the typewriter carriage, in letter-feeding from right to left in the usual manner, shall feed the index-pin-setting carriage step by step in a reverse direction, as from left to right. By this arrangement, the finished typed card is delivered from the platen of the typewriter directly to the receiving position for the card on the perforating machine, and the transfer of the card is accomplished by a sliding movement without raising the card from the paper-table, which is a highly efficient method of operation. Furthermore, the two carriages being fed in reverse directions provides that the card may be removed from the platen and passed to the perforating machine, with the top edge in and the face of the card turned up in full view of the operative, which is a more satisfactory method than when the card is turned face down and reversed end for end, as would be the case if the two carriages were moved in unison in the same direction.

Another very important feature includes a mode of operation whereby the operative can manipulate the two machines without removing his hands from the keyboard, except to first adjust a card to the platen and subsequently move the typed card from the platen to the perforating machine. The typewriter includes the well-known Underwood power-driven carriage-return mechanism, and the perforating machine is operated by a separate source of power for single cycles of movement, and both these power means are controlled by individual keys at the keyboard. Thus, with the typewriter carriage at the zero scale position, a blank card is adjusted at the top face of the platen with the lower edge squared against and gripped by a suitable card-holding means, and the card drawn around the platen at the front to the printing-line position thereon. At the end of the typed-line entry, the platen is rotated forwardly against a stop and the card released from the platen and slid over the paper-table to the perforating machine. The depression of a control-key causes all the set-up index-pins to operate in unison to effect the punching of descriptive holes in the card. The depression of a second control-key operates to return both carriages to their initial positions, and the set-up values of the index-pins are automatically wiped out during this restoring movement of the carriages. Thus a series of successive operations at the keyboard of the typewriter results in the card being typed for a visual record for filing purposes and punched with holes descriptive of the items typed that are subsequently employed selectively in various ways for accounting, computing, labor distribution, reports and many other forms of commercial records.

Other features and advantages will hereinafter appear.

In the accompanying drawings,

Figure 1 is a plan view of the typewriting and perforating machines coupled together in a manner forming the subject-matter of the present invention. The carriages of both machines are positioned at the extreme line-end positions, with many of the parts omitted and others broken away for clearness.

Figure 5 is a fragmentary front view, on an enlarged scale, of the index-pin-setting carriage and the method of mounting the same, also the means carried by the carriage for releasing or restoring the punch pins after a card-punching operation.

Figure 6 is a detail view of four of the punch-operating pins, the locking bar and the bell-crank that releases the pins by vibrating the bar.

Figure 7 is a plan view of the perforating machine table and the method of attaching a supporting base thereto for the typewriting element.

Figure 8 is a side elevation of Figure 7.

Figure 9 is a full-size view of the Underwood escapement mechanism, showing every other tooth of the escapement-wheel removed, and the rack-pinion reduced in size to time the letter-spacing movement of the typewriter carriage to the spacing of the punches in the perforating machine.

Figure 10 is a side view, partly in section, of the distribution box where the circuit-closing operation of the typewriter-keys is conveyed to electro-magnets in varying combinations to operate push-wires to the index-setting pins.

Figure 11 is a plan view of a section of the switch box on the line 11—11 of Figure 3, showing the key-actuated contacts leading to the distribution box.

Figure 12 is a circuit chart, showing the various circuits from each key in the keyboard that merge together for variable combinations to energize the twelve electro-magnets for variable transmissions to the index-setting pins.

Figure 13 shows a card employed with this combination machine where items are typed thereon and corresponding values are punched in the card.

Figures 2, 3:
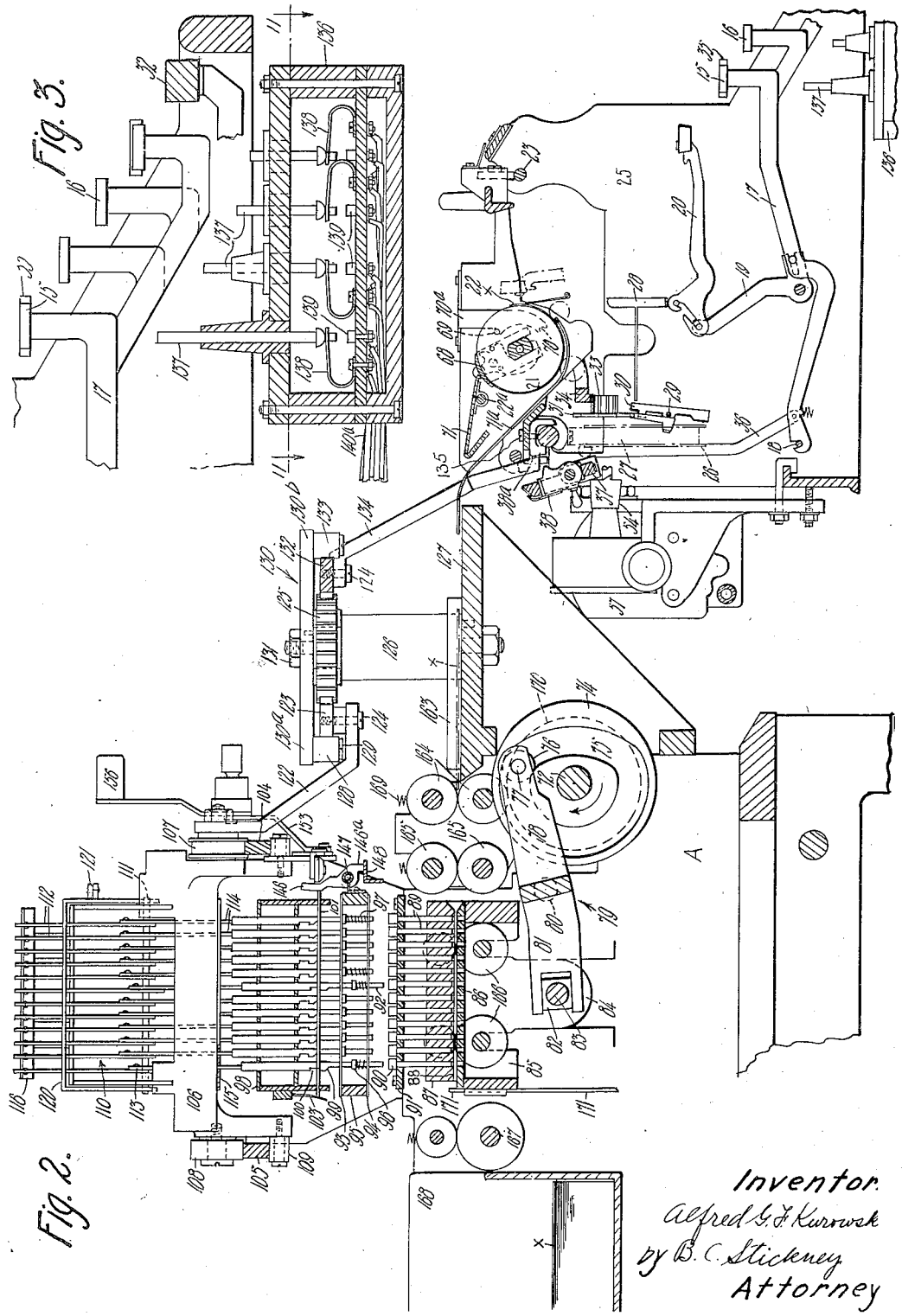
Figure 2 is a vertical section approximately through the center of the two machines, shown at Figure 1.
Figure 3 is an enlarged section through the bank of keys of the typewriter, and showing a cross-section through a switch box under the keyboard, where each key, when depressed, operates a plunger that closes the circuit through two normally open electric terminals.

Numeral-keys 15 and alphabet-keys 16, when depressed, swing key-levers 17 about a fulcrum-rod 18 to actuate bell-cranks 19 to swing type-bars 20 upwardly and rearwardly against the front face of a platen 21. The platen is rotatably mounted within a carriage 22 mounted for to-and-fro movement upon carriage rails 23 and 24 on the main frame 25, and is urged from right to left by a spring-drum 26 on the frame, which is connected by a strap 27 to the carriage. To effect letter-space movement of the carriage, the type-bars engage a universal bar 28 movable rearwardly to actuate an escapement-rocker 29 carrying escapement dogs 30, which co-operate with the teeth of an escapement-wheel 31 to effect step-by-step letter-space movement of the carriage at the actuation of each key or a space-bar 32. The escapement-wheel is rotated in one direction by a pinion 33 engaging with the teeth of the carriage-feed-rack 34 pivoted to the carriage-frame.

The tabulating mechanism, as disclosed in the patent to Crutchley, No. 929,080, dated July 27, 1909, includes a tabulator-key 35 fulcrumed at the rod 18 and provided with a draw-link 36 that connects with a rocking bar 37 carrying a series of stops 38 and movable into the path of a carriage-stop 38ᵃ, and simultaneously raises the carriage-feed-rack 34 out of engagement with the pinion 33 to release the carriage to the action of its spring-drum 26 for column-skipping purposes in the well-known Underwood manner.

Figure 4:
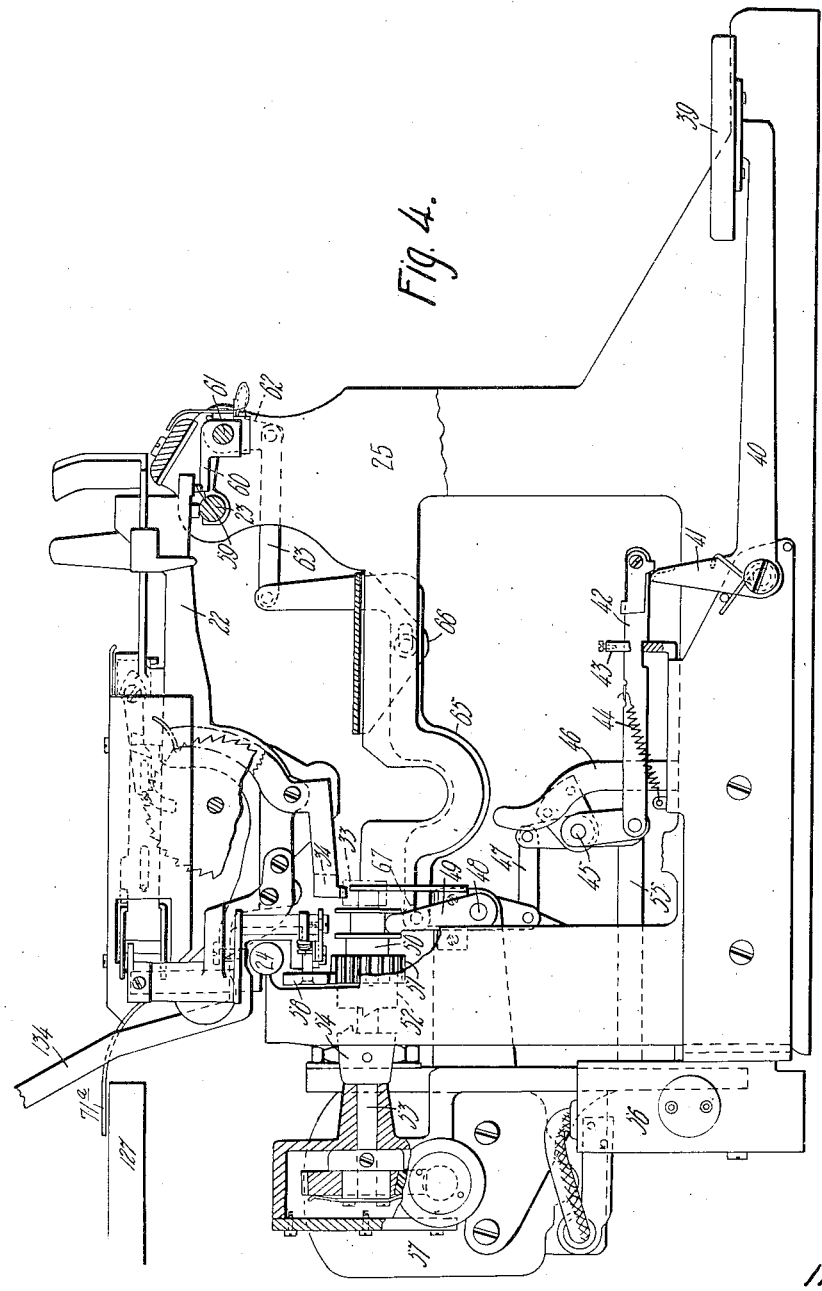
Figure 4 is an enlarged elevation of the left-hand side of the Underwood typewriting machine, illustrating in detail the power-driven carriage-returning mechanism.

It is desirable in machines of this character that the operative may effect the various operations without removing the hands from the keyboard of the machine. To this end, means are provided for a key-controlled power-driven carriage-return, which relieves the operative of manipulating the usual line-space lever to manually throw the carriage to the right at the line-end of each typing operation. The means employed herein is disclosed in my application, Serial No. 41,507, filed July 6, 1925, where the depression of a carriage-return key 39 (see Figure 4) vibrates a lever 40 to cause an arm 41 to cam the forward end of a link 42 upwardly to break the interlock between the notched lower edge of the link with a slotted bracket 43, and thus release said link 42 to the action of a spring 44, which draws the link rearwardly to rock a shaft 45 journaled in brackets 46. Rocking the shaft 45 causes a link 47 to rock a second shaft 48 to impart movement to an arm 49 engaging between flanges of a sleeve 50 formed integrally with a pinion 51 and a clutch-member 52 rotatable about a driving shaft 53. The vibration of the arm 49 under the influence of the spring 44 shifts the sleeve 50, pinion 51 and clutch-member 52 along the shaft 53 to bring said clutch-member 52 into an interlock with a second clutch-member 54 fixed to the shaft 53. Rocking the shaft 45 to throw into engagement the two clutch-elements 52 and 54 simultaneously shifts a bar 55, which extends into a switch box 56 for the purpose of closing an electric circuit to a motor 57 that is geared to the shaft 53. The pinion 51 is in train with a rack 58 secured to the carriage, and said pinion is always in engagement with the rack in any shift position of the pinion. Thus at the line-end position of the carriage the depression of the key 39 simultaneously throws the two clutch-members 52 and 54 into engagement and energizes the motor, so that the pinion becomes a driving element for the rack 58 and the carriage is moved rightward for a new line-setting.

To stop the rightward power-driven movement of the carriage, means are required to open the clutch-members 52 and 54 and also reopen the circuit to the motor, and for this purpose a cam 59 on the front rail of the carriage engages an arm 60 secured to a rock-shaft 61, which is rocked by said arm when the cam 59 depresses said arm 60 at the extreme right-hand carriage position. The rocking of the shaft 61 vibrates a crank-arm 62 to impart a rearward movement to a link 63 connected to an upright arm 64 of a connection 65, which is suspended at the forward end by a screw-and-slot construction 66, and the rear end thereof connected to a crank-arm 67 fast on the shaft 48. When the clutch-elements are operated, the various connections to the rock-shaft 61 will cause the arm 60 to rise above the position shown at Figure 4. At the end of the return movement of the carriage, the cam 59 will rock the shaft 61 and the shaft 48. The sleeve 50 will be shifted forwardly by the arm 49 and the two clutch-members separated to the inoperative positions shown in this figure. Rocking the shaft 48 will withdraw the bar 55 to stop the motor, and the link 42 will be moved forward against the tension of the spring 44 until the notch on the under side of the link drops over the edge of the slot in the bracket 43 and is locked.

In this manner the carriage is returned by the power-driven means controlled by a key, and the carriage is automatically arrested at the initial position of a line, as set forth in my pending application referred to above.

As the present machine is employed to type cards, the platen may be supplied with a suitable card-holder similar to that disclosed in the pending application of Joseph Lindburg, Serial No. 700,809, filed March 21, 1924 (now Patent No. 1,600,235, dated September 21, 1926), where the usual card-plate 68 is removably secured to the platen at the ends thereof and formed with an under-cut longitudinal edge to receive the edge of the card, and a beveled edge to ride under a paper-scale. The platen may further be provided with a stop-pin 69 that rotates between two stop positions 70 on a bracket 70$^a$ secured to the carriage-frame to arrest the platen at the forward position, where the card may be conveniently inserted under plate 68, and at the rearward position, where the card has been carried around the platen at the front to position the top edge of the card at the printing position for a single line typed entry.

To facilitate the insertion of the card to the platen, a supplementary paper-table 71 is secured to a rod 22$^a$ to assume a horizontal position in alignment with the under-cut edge of the card-plate at the card-insertion position of the platen, so that the card may slide from said table directly into the card-plate. After the card is typed and the platen rotated forwardly to release the card from the holder, the card will lie flat on the table and be directed rearwardly for purposes to appear.

The rear edge of the table 71 is bent back upon itself to stiffen the structure, and also to provide an open space between said table and the regular paper-table 71$^a$. This provides that, when the card-plate 68 is removed from the platen and the perforating connections rendered inactive, a work-sheet may be adjusted around the platen from the rear in the usual manner for regular typewriting work.

The card-punching machine shown in the drawings is the well-known Powers card-perforator where the manipulation of the numeral-keys successively sets up numeral values at each letter-space position lengthwise of the card, and subsequently operates punches to pierce the card at a single operation by key-controlled power-driven means. The present invention includes such parts of the Powers perforator as are essential to select and operate the punches and feed the card under the punches; the Powers keyboard-control being superseded by a key-control at the typewriter, as will presently appear.

The present Powers machine includes the main driving shaft 72 operated by a suitable source of power through clutch-elements 73 operated by a key-control similar to that disclosed in the patent to Lasker, No. 1,287,706, dated December 17, 1918, where a pin is thrown into engagement with a continuous rotating element, and automatically thrown out of engagement therewith at the end of each cycle of rotation of the shaft 72. This shaft 72 extends across the machine between the two side walls of a frame A, and adjacent the center of its length a cam-head 74 is secured thereto. The head 74 includes a cam-groove 75 cut in the side face thereof and arranged to receive a follower roll 76 mounted to rotate upon a stud 77 fixed to the end of an arm 78 positioned in the middle of a frame 79 that is fulcrumed at 80 in the side walls of the frame A, and is provided at each end with an arm 81 extending rearwardly. Each arm 81 is bifurcated at the free end to slidably receive a square block 82 mounted to rotate upon a rod 83 secured at each end to ears 84 that depend from a hollow rectangular frame 85. This frame 85 is guided in any suitable manner upon the frame A for a straight up-and-down movement under the control of the two arms 81, and carries a die-plate 86. This die-plate 86 is formed with a plurality of holes, which, for the purpose hereinafter described, are arranged in twelve longitudinal rows, forty-five holes in each row, making a total of five hundred and forty holes in said plate. A rectangular bar or plate 87 is secured to the frame 85 directly over the plate 86, but separated therefrom by a gap or open space 88 to provide for the free passage of a card between said plate 86 and the bar 87. The bar 87 is perforated with holes in exact alignment with the perforations in the plate 86, and within these holes are arranged vertically-disposed punches 89. These punches, as shown, are formed with enlarged heads 90 arranged to bear against the upper face of a punch guide-plate 91 secured conveniently to the frame.

Individual index-pins or interponents 92 are arranged over the punches, and these pins, at their lower ends, are guided by two parallel plates 93 and 94 secured to bars 95 fixed at their ends to the frame A, and each pin is provided with a shoulder 96 to normally stop the upward movement of the pin under the tension of a spring 97 compressed between the shoulder 96 and the plate 94. The upper ends of these index-pins 92 have guide-bearings within two horizontal walls of a stationary frame 98 with the free upper ends extending above the upper wall thereof. Each pin 92 is further formed with a camming face 99, and a groove or notch 100. Each row of twelve pins is provided with a latch-bar 101 having tongues 102, Figure 6, to engage individually with each pin, and the depression of a pin cams the latching means longitudinally, and immediately snaps back to enter the groove 100 under the influence of a spring 103, which locks the depressed pin or pins in their operative positions.

At the front and rear of the frame 98, tracks 104 and 105 are suspended across the machine, and secured at each end to the main frame A, and upon these tracks a carriage or carrier 106 travels over the whole series of index-pins 92. This carriage 106 has two flanged rollers 107 at the front to bear upon the front track 104, and a single roller 108 to bear upon the rear track 105, and to prevent displacement of the carriage relatively to the tracks, rollers 109 are mounted on the carriage to underlie and engage with the lower face of each track.

The carriage 106 carries a series of twelve bell-cranks 110 fulcrumed upon a rod 111, and each bell-crank includes a vertically-disposed arm 112 and a horizontal arm 113. The free ends of each arm 113 are pivotally connected to an index-setting pin 114 that is guided at the lower end by a plate 115 that aligns the series of pins 114 with a row of corresponding index-pins 92. Adjacent the upper ends of the arms 112 of the bell-cranks 110, a bar 116, forming part of the carriage-frame, carries a series of push-pins 117 housed therein to align with the positions of the arms 112, and each pin operated by a push-wire 118 carried within a flexible cable 119 comprising a close-wound wire spring. The end of each cable 119 is forced within one end of the hole in the bar 116, and the push-wire 118 projects therefrom to abut a push-pin 117 to engage an arm 112 of a bell-crank 110. To restore the bell-cranks 110 as a series, a universal bar 120 is pivoted to the carriage-frame and provided with a spring 121 to urge said bar against the adjacent arms 112 of the bell-cranks, and hold said arms under pressure against the pins 117.

If the push-wire 118 of any cable 119 be forced outwardly, the end thereof will push the pin 117 to swing the arm 112 of its bell-crank, and cause the arm 113 to depress an index-setting pin 114, which, in turn, will depress its associated index-pin 92 to be locked in a set position where it will intercept the upward movement of its associated punch 89, and cause the punch to perforate the card. Similarly, if two or more wires be operated in unison, the corresponding index-pins will be set up in unison.

Further details of the card-punching means and the method of setting index-pins to intercept the upward movement of the punches, and thereby perforate holes in the cards, will be found in the patents to Powers, No. 1,388,299, dated August 23, 1921, and No. 1,299,022, dated April 1, 1919.

In the Powers machine carriage-feeding means is provided, whereby the carriage 106 will move step by step, distances equal to the longitudinal spacing of the punches; the carriage having an escapement-mechanism and a carriage-motor.

For the purpose of the present invention these controlling elements for the carriage 106 are removed from the machine, and in their place means are provided whereby the carriage of the perforating machine will be controlled by, and moved step by step in unison with, the carriage of the typewriter. To this end, arms 122 extend downwardly and forwardly from said carriage where their free ends support a rack-bar 123 secured thereto as by screws 124 passing through said arms, and threaded into the rack-bar 123. The teeth of this bar 123, at all positions of the carriage 106, are in operative engagement with the teeth of a gear 125 that rotates freely about an axis formed at the upper end of a post 126 secured to the face of a bracket 127, forming part of the main frame A. To prevent any possible displacement between the rack and the gear, a roller 128 bears against the rear face of the rack-bar 123. This roller is mounted upon a shoulder-screw 129 threaded into an arm 130ª of a cross-bar 130 secured to the upper end of the post 126 over the gear 125 by a check-nut 131.

At the front side of the gear 125 a second rack-bar 132 is arranged to mesh therewith parallel with the rack-bar 123, and is provided with a backing-up roller 133 secured to an arm 130ᵇ in a manner similar to that described for the roller 128. This rack-bar 132 is suspended by, and secured to, the upper ends of two arms 134 that are secured to a part of the carriage-frame, as by screws 135.

From this description it will be noted that any movement of the typewriter-carriage 22 will cause the rack-bar 132 to move in unison therewith, and such movement in either direction will rotate the gear 125, and said gear in turn will shift the rack-bar 123, and cause the carriage 106 to have a movement equal to the movement of the typewriter-carriage, except that it will be in reverse directions. When the escapement-mechanism of the typewriter operates to move the typewriter-carriage step by step letter-space distances from right to left, the carriage 106 carrying the index-setting pins will be moved uniformly through similar letter-space distances. When the tabulator-key 35 is depressed the carriage of the typewriter is released and arrested at a column position predetermined by a column-stop setting, and the carriage 106 will have a similar movement; and at the end of a line, where the power-driven carriage-return becomes effective to restore the carriage to the initial line position, the carriage 106 will also be restored. Thus at every movement of the carriage of the typewriter for any kind of a shift movement, whether it be automatic or manual, an accurate transmission of the typewriter carriage-movement will be conveyed to the perforating machine carriage under all conditions.

The usual letter-spacing of the typewriter elements is ten spaces to the inch. A similar spacing of the punches 89 in the card-perforating machine would bring the punched holes so close together as to weaken the structure of the card when the card is subsequently run through a translating machine. For this reason the spacing of the punches in the card-perforating machine becomes a standard for the spacing of the characters typed by the typewriter. To this end, as shown at Figure 9, provision is made to increase standard letter-spacing of the typewriter mechanism by removing every other tooth of the escapement-wheel 31 and reducing the diameter of the escapement-pinion 33. The ratio of transmission between the escapement-wheel 31 and the pinion 33 to the carriage-feed-rack 34 will be equivalent to the longitudinal spacing of the punches 89, so that, when a card is inserted into the typewriter and a typed item entered along the upper edge, perforations may be subsequently made in the card which will be in exact vertical alignment with the characters typed.

As a means of communication from the keyboard of the typewriter to the index-pin-setting mechanism, a switch-box 136 is arranged underneath the typewriter-keys which include vertically-disposed plungers 137 to underlie each key-lever 17. Each plunger rests upon a spring contact 138 which, upon being depressed, engages with a fixed contact 139 to close a circuit between two wire terminals 140. The spring contacts 138 may be formed from a continuous strip of metal which extends across the keyboard to include a bank of keys, and all the strips connected to a common electric terminal. The contacts 139 have individual wire circuits which are bunched together to form a cable 140ᵃ that enters a distribution box 141 where certain wires are merged together to energize one or more of a series of twelve electromagnets 142, designated separately $a, b, c, d, e, f, g, h, i, j, k, l$, in varying combinations predetermined by the character or numeral typed. These circuits are shown diagrammatically as Figure 12, where the several circuits to the twelve electromagnets may be traced to the keys, as, for example, the magnet $d$ is enrgized by either one of the keys 4, F or S, which indicates that each of these keys energizes the $d$ magnet in different combinations with other magnets.

Each magnet 142 is formed with a hollow core 143 within which an armature 144 is arranged to be drawn upwardly by magnetic attraction and to drop by gravity. The upper end of each armature is reduced in diameter to slide within a bushing 145 set into the box 141 for a giude, and the end thereof may be drilled centrally to receive the end of the push-wire 118 which may be soldered or otherwise secured within the drilled hole.

It is evident that when a key 15 or 16 closes a circuit to one or more of the magnets 142, their respective armatures 144 will be attracted, and a pushing motion will be conveyed to their wires 118 which pass through the flexible wire cables 119 to push the pins 117 to vibrate their respective bell-cranks 110, so as to set one or more index-pins 92 in unison ready to intercept the rising punches 89 to perforate a card.

When the typewriter-carriage is set to the zero position of the scale, the carriage 106 will be positioned where the twelve index-setting pins 114 will overlie the first row of twelve index-pins 92. Upon the depression of any typewriter-key to type a character, circuits are closed through the contacts 138 and 139 to magnets which operate to set one or more index-pins, and the index-setting pins are restored by the return stroke of the key breaking the connection between said contacts 138 and 139. During this return stroke of the key, the carriage-feed of the typewriter is effective in the usual manner to feed the carriage one letter-space distance, and conveys a similar movement to the carriage 106, and the index-setting pins 114 will be shifted as a series from the position of the first row of index-pins 92 to the second row; and, after the second character is typed, to the third row of pins; or, if the space-bar 32 is depressed, said series of pins 114 will skip a row of index-pins. In this manner, the typing of a line longitudinally of the card sets up, step by step, index-pins which align with the letter-spacing of the typed entry on the card and merge into groups widthwise of the card in combinations that are descriptive of the characters typed.

These index-pins, after performing their function to force their associated punches through the card, must be restored during the return movement of the carriage 106. To this end, each latch-bar 101, as previously described, cooperates with a row of twelve index-pins, and, as there are forty-five rows to cover the area of the cards employed, there will be forty-five of these latches in longitudinal alignment. The forward end of each latch, Figure 2, is spring-pressed against a crank-arm 146 rotatable about a fulcrum-rod 147. To check the motion of these latches under the tension of their springs 103, the crank-arm 146 is formed with a stop-arm 146ª to bear against a stop-bar 148 which engages the whole series of crank-arms.

If the crank-arm 146 of Figure 6 is vibrated rightward, latch-bar 101 will be shifted against the spring 103, and the tongue 102 will be withdrawn from the notch 100 in the edge of the index-pin 92 shown depressed, and said pin will be restored through the action of the spring 97. To effect the release of all the set-up index-pins 92, a roller 149 is mounted at one end of a lever 150 which fulcrums at 151 upon a bracket 152. The opposite end of the lever 150 is pivotally connected to a link 153 connecting said lever to an arm 154 fulcrumed at 155 to the carriage 106. A finger-lever 156 vibrates the arm 154 against the tension of a spring 157, and when this finger-lever is shifted to the left of Figure 5, the arm 154 will draw the link 153 upwardly to vibrate the lever 150 and shift the roller 149 down to the dot-and-dash position 149ª where the swinging movement of said lever 156 will be arrested by the lever 150 engaging with a stop 152ª on the bracket 152, and any further pressure upon said finger-lever in a leftward direction will cause the carriage to travel in the same direction. At the end of a pin-setting operation, the carriage 106 is positioned as at Figure 1, and as the carriage moves leftward from this position the roller 149 will successively engage each crank-arm 146 to shift the latch-bars 101 and effect the release of all the set-up pins 92. At the end of the leftward movement, which may be determined by the margin-stop on the typewriter-carriage, the lever 156 is released, and the spring 157 restores the several parts to normal inoperative positions determined by the engagement of the lever 150 with a stop 152ᵇ on the bracket 152. The operation just described provides for a manual restoration of the set-up index-pins.

It is a feature of the present invention to effect the pin-restoring operation automatically, although the manual means, just described, is retained for special manipulations. The normal position of the lever 156 is shown at Figure 5, where the carriage 106 is shown at an intermediate position. In the pin-setting operation the carriage 106 travels to the right of Figure 5, and when the last character in the line is typed and the active index-pins in the last row are set, the lever 156 will have passed to a position where a fixed stop 158 on the frame has engaged the lever 156 and caused it to swing leftwardly about its fulcrum 151 to lower the roller 149 to the plane of 149ª, as previously described, for a hand manipulation of said lever. To prevent the lever 156 from being restored at an initial leftward movement by the spring 157, a pivoted latch 159 under the influence of a spring 160 snaps over the edge of the lever 156, and when the carriage 106 is shifted to the left and towards the initial zero position, the roller 149 will roll over the whole series of arms 146, and at the extreme end of this leftward carriage movement, where the roller has released all the index-pins 92, a crank-arm 161 on the latch 159 will be brought into contact with an adjustable stop 162 mounted on the frame, which effects the release of the lever 156 by withdrawing the latch 159, and said lever 156 and the several connections to the lever 150 will be restored to normal by the spring 157, and the roller 149 will be raised to its normal ineffective position, shown in full lines at Figure 5.

Thus the movement of the carriage 106 at the end of a pin-setting movement automatically sets the pin-restoring means which becomes effective during the carriage-return movement, and automatically becomes ineffective at the end of the return movement of the carriage, and the burden of returning the carriage 106 and restoring the index-pins 92 is carried by the power-driven carriage-return mechanism connected to the carriage of the typewriter.

Referring to Figure 2, the top face of the bracket 127 forms a delivery table for the card x after it has been typed; the card being pushed or slid over the face of the table between edge guides 163 to pairs of feed-rollers 164 and 165 which carry the card into the gap 88 between the plate 86 and the bar 87 where other rollers 166 receive the card, and in turn carry it through the gap to rollers 167 which deposit the finished card in a suitable receptacle 168. The upper roller of each pair of feed-rollers has springs 169 at each end to create a gripping pressure sufficient to feed the cards. The whole series of rollers are rotated in unison by a train of connecting gearing driven by a gear 170 of the main shaft 72, and the ratio of transmission from the gear 170 which makes one cycle of motion with the shaft 72 is such that the feeding capacity of the rollers is equivalent to approximately one-half of a cycle of said shaft. This enables the first pair of rollers 164 to pick up the card and feed it to the succeeding rollers 165 and 166, which in turn carry the card through the gap 88 where the leading edge of the card is arrested by stops 171 before the first half of the cycle is completed. Any excess of rotation causes the two pair of rollers 166 to roll lightly over the faces of the card which is held stationary by the stops 171. Thus, in the introduction of the typed card to the rollers 164, the first half cycle of the shaft 72 carries the card against stops 171, and the last half of the cycle of motion vibrates the frame 79 to raise the perforating frame 85 and cause such punches 89 that are intercepted by the locked-down index-pins to perforate the card, and at the extreme end of the cycle said stops 171 are withdrawn by a cam action, not shown. This leaves the finished perforated card within the gap 88 to be fed to the rollers 167 and into the receptacle 168 during the first half of the next cycle of the shaft 72, when the next typed card is introduced to the rollers 164. Further details of this card-feeding mechanism may be seen in the aforesaid patent to Powers, No. 1,388,299.

To control the rotation of the main driving shaft 72, a trip-key 172, Figures 1 and 12, closes a circuit to a magnet $m$ in the box 141 to transmit a pushing movement to a wire 173 housed within a resilient cable, as heretofore described, which extends across the machine to operate a trip in a manner shown and described in the patent to Lasker, already referred to, which provides for a single cycle of motion being conveyed to the shaft 72 from a continuous source of power, indicated at 174, at each depression of the trip-key 172.

Some forms of card records, as, for instance, insurance items, require entries indicating the month, as by typing the numeral "1" for January and "12" for December, etc. The nine numeral-keys operate to indicate the first nine months, but the tenth month, indicating October, would in the usual manipulation of the keys require that a "1" key and a "0" key be depressed with the usual letter-space movement of the carriage between the impressions. For purposes of the present invention this double letter-spacing is objectionable, and the types operated by the keys "10", "11" and "12" are of logotype form, where the two numerals are arranged upon a single type-bar. These three keys close circuits to energize a series of magnets to predetermine punched-out positions in the card which are descriptive of the compound number.

It will be noted at Figure 12 that three keys are designated as "30", "40", "50". These keys are not employed during the typing of a card shown at Figure 13, but are retained in the keyboard to indicate the capacity of the machine to include other forms of logotypes for special purposes.

One form of card, shown at Figure 13, is employed for insurance records. This card is laid down flat on the table 71, face side up and with the lower edge forward. The platen having first been positioned by the stop-pin 69 to abut the stop 70, the receiving edge of the card-plate 68 will be level with the top side of the table, and said card will slide from the table and under the card-plate to be gripped by the edge of said plate. The platen may now be rotated backwardly to draw the card around the platen at the front until the stop-pin 69 reaches the stop position shown at Figure 2, where the top edge of the card is in alignment with the printing line of the types. The typewriter having been set at the extreme right-hand position determined by a margin-stop, the carriage 106 will be positioned at the extreme left-hand position. The first entry made upon a card indicates the date which, in being typed, sets up corresponding index-pins in the perforating machine. The next entry on the card is the typing of the policy number, and to skip the intervening space between these two entries the tabulator-key 35 is depressed to release and arrest the typewriter-carriage at the column-stop position, and the carriage 106 will move a similar distance and pass idly over intermediate rows of index-pins. After typing the policy number, another tabulating movement of the carriage is required to position the card at the decimal-point position in the amount column. As the amount to be typed indicates a hundredths entry, a back-space key 176, which operates to back-space the carriage after the manner disclosed in the patent to Helmond, No. 1,414,738, dated May 2, 1922, is depressed twice to move the carriage backward two points, and the amount is typed in denominational order and accurately translated by the setting of the index-pins in columnar alignment. The other items are typed in a similar manner, and the carriage is finally skipped to a zone of the card where the name of the insured is to be typed.

Provision is made for a comparatively long name, and the typing of a shorter name beginning at the same initial line-space position will leave a blank space at the end of a line, and, as already described, the automatic shift of the pin-clearing roller 149 becomes automatically effective only at the line-end position. Depression of the tabulator-key 35 skips the carriage, after the typing of the name is completed, to its final line-end position where the stop 158 shifts the roller into "clearing" position 149ª and the card-position on the typewriter-carriage will be in exact alignment with the guides 163. When the platen is rotated forwardly against the stop 70 and the card released from the card-holder plate 68, the card will lie flat upon the paper-table 71, and, by a rearward sliding movement, will enter the two guides 163 with the edge of the card pressed between the feed-rollers 164. The trip-key 172 is depressed to operate the clutch 73 and cause a cycle of the driving shaft 72, which feeds the typed card into the gap 88 and aligns it against the stops 171, and, during the last half of the cycle of the shaft 72 and while the card is held stationary by the stops 171 against the rotation of the rollers 166, such index-pins which have been depressed will cause their associated punches to pierce the upwardly-carried card, after which the card is stripped from the punches by the downward movement of the frame 85.

The carriage-return key 39 is now depressed, which operates, as already described, to return the carriage for a new line, and as the roller 149 is set to clear the index-pins 92 the restoring movement of the carriage 106 will cause said roller to vibrate successively the whole series of arms 146 to vibrate the latch-bars 101 to release the index-pins 92, and at the end of the leftward movement of said carriage the stop 162 will operate to shift the roller 149 to a position that is inoperative during the pin-setting movement of the carriage. It will be noted that the perforated card is still within the gap 88, and will be run out into the receptacle 168 during the feeding of the next card to the perforating position.

Thus, by mechanically joining the carriage 106 to the carriage of the typewriter, absolute synchronism is maintained between the two carriages; the "clearing" of the index-pins becomes an automatic operation; the burden of shifting the carriage 106 and operating the pin-clearing mechanism becomes a power-driven operation; and, if the wrong character is typed, the typewriter-carriage may be shifted backwardly in the usual manner, the wrongly-typed character erased from the card, and, in retyping a character in this space, the operation of setting a new combination of index-pins, descriptive of the character retyped, will automatically release the old setting of the pins by the camming action of the pins upon the latch-bars 101. It will be further noted that provision is made to tabulate, backspace and return the carriage, and that all of these operations are performed without requiring the operative to remove his hands from the keyboard.

Referring to Figure 12, the line circuit through the magnets carries a current which may be reduced to the proper voltage by use of a transformer, indicated at 175, and the line may also include a cut-out switch 175ª when it is desired to use the typewriter elements independently of the perforating connections.

At Figures 7 and 8, a stand 177 is illustrated, which now is used to support the Powers perforating elements, and suitable side arms 178 may be secured to the frame to extend forwardly and be stiffened by a suitable tie-rod 179 and one or more braces 180 to form a rigid supporting platform for the typwriter at the front side of the Powers machine, so that the two machines may be moved or shifted about as a single unit.

Variations may be resorted to within the scope of the invention, and portions of the improvements may be used without others.

Having thus described my invention, I claim:

1. The combination with a set of keys or operators, of a typewriter mechanism controlled thereby and including a carriage, a perforating mechanism also controlled by said keys and also including a carriage, a driving train of mechanism mechanically connecting said carriages for simultaneous letter feed and return movements, and a single letter-feeding mechanism controlled by said keys for controlling both carriages.

2. The combination with a set of keys or operators, of a typewriter mechanism controlled thereby and including a carriage, a perforating mechanism also controlled by said keys and also including a carriage, means mechanically connecting said carriages for simultaneous movements in opposite directions, and a single letter-feeding mechanism controlled by said keys for controlling said carriages.

3. The combination with a set of keys or operators, of a typewriter mechanism controlled thereby and including a carriage movable in advance and return directions, a perforating mechanism also controlled by said keys and also including a carriage movable in advance and return directions, means mechanically connecting said carriages for simultaneous movements in opposite directions, a single letter-feeding mechanism controlled by said keys for controlling the advance movement of said carriages, and a single power-driven mechanism for returning said carriages.

4. The combination with a set of keys or operators, of a typewriter-mechanism controlled thereby and including a carriage, a perforating mechanism also controlled by said keys and also including a carriage, a rack on the typewriter-carriage, a pinion operated by the rack, said rack and pinion forming part of a train connecting said carriages so that they move simultaneously, and a single letter-feeding mechanism controlled by said keys for controlling said carriages.

5. The combination with a set of keys or operators, of a typewriting mechanism controlled thereby and including a carriage, perforating mechanism, means including electro-magnets whereby said keys control said perforating mechanism, a perforating carriage forming part of said perforating mechanism, means mechanically connecting said carriages for simultaneous movements, and a single letter-feeding mechanism controlled by said keys for controlling said carriages.

6. An apparatus for punching holes selectively in columns upon a card and typing captions or data in said columns, including a set of keys, a card-typing mechanism controlled by said keys and including a carriage and letter-feeding mechanism therefor, said apparatus also including a perforator-mechanism under the control of the same keys, said perforator-mechanism having card-punching devices which are set up by said keys while a card is being typed; whereby said card after being typed may be withdrawn from the typing mechanism and inserted in the perforator-mechanism and punched by means of previously-set punching devices; the pitch of the letter-feeding movements of the typewriter-carriage coinciding with the pitch of column-spacing of the punches.

7. An apparatus for punching holes selectively in columns upon a card and typing captions or data in said columns, including a set of keys, a card-typing mechanism controlled by said keys and including a carriage and letter-feeding mechanism therefor, said apparatus also including a perforator-mechanism under the control of the same keys, said perforator-mechanism having card-punching devices, arranged in columns, which are set up, column by column, by said keys while a card is being typed; whereby said card after being typed may be withdrawn from the typing mechanism and inserted in the perforator-mechanism and punched by means of previously-set punching devices; said perforator-mechanism including a carriage also under control of said keys and having punch-column-registering movements of the same pitch as the feeding mechanism of the typewriter-mechanism.

8. An apparatus for punching holes selectively in columns upon a card and typing captions or data in said columns, including a set of keys, a card-typing mechanism controlled by said keys and including a carriage and letter-feeding mechanism therefor, said apparatus also including a perforator-mechanism under the control of the same keys, said perforator-mechanism having card-punching devices, arranged in columns, which are set up, column by column, by said keys while a card is being typed; whereby said card after being typed may be withdrawn from the typing mechanism and inserted in the perforator-mechanism and punched by means of previously-set punching devices; said perforator-mechanism including a punch-column-registering carriage, and means mechanically connecting the same to the typewriter-carriage for simultaneous movements thereof in steps of the same pitch for both carriages.

9. An apparatus for punching holes selectively in columns upon a card and typing captions or data in said columns, including a set of keys, a card-typing mechanism controlled by said keys and including a carriage and letter-feeding mechanism therefor, said apparatus also including a perforator-mechanism under the control of the same keys, said perforator-mechanism having card-punching devices, arranged in columns, which are set up, column by column, by said keys while a card is being typed; whereby said card after being typed may be withdrawn from the typing mechanism and inserted in the perforator-mechanism and punched by means of previously-set punching devices; said perforator-mechanism including a carriage also under control of said keys and having punch-column-registering movements of the same pitch as the feeding mechanism of the typewriter-mechanism; said carriages having racks forming part of a gear-train for moving said carriages in opposite directions.

10. An apparatus for punching holes selectively in columns upon a card and typing captions or data in said columns, including a set of keys, a card-typing mechanism controlled by said keys and including a carriage and letter-feeding mechanism therefor, said apparatus also including a perforator-mechanism under the control of the same keys, said perforator-mechanism having card-punching devices, arranged in columns, which are set up, column by column, by said keys while a card is being typed; whereby said card after being typed may be withdrawn from the typing mechanism and inserted in the perforator-mechanism and punched by means of previously-set punching devices; said perforator-mechanism including a carriage also under control of said keys and having punch-column-registering movements of the same pitch as the feeding mechanism of the typewriter-mechanism, and a motor connected to said carriages to return the same for beginning a new line of operations.

11. The combination with a set of keys or operators, of a typewriter-mechanism controlled thereby and including a carriage, a perforator-mechanism also controlled by said keys and also including a carriage, means mechanically connecting said carriages for simultaneous step-by-step movements of the same pitch for both carriages but in opposite directions, and a single letter-feeding mechanism controlled by said keys for controlling said carriages.

12. In a combined typewriting and perforating machine, the combination of relatively movable typewriting and perforating machine carriages, letter-space feeding mechanism for one carriage, and a gear train connecting the two carriages, whereby both carriages will be letter-spaced in opposite directions, said train including racks on the carriages.

13. In a combined typewriting and perforating machine, the combination of relatively movable typewriting and perforating machine carriages, a single carriage-feeding mechanism, and mechanical means enabling said single carriage-feeding mechanism to letter-space the two carriages in opposite directions.

14. In a combined typewriting and perforating machine, the combination of relatively movable typewriting and perforating machine carriages, a rack carried by one carriage, a gear rotated by the rack about a fixed axis, a rack carried by the other carriage and in train with the gear, and key-actuated mechanism feeding both carriages, the pitch of all the feeding movements being uniform.

15. In a perforating machine, the combination of normally inoperative punch-operating index-pins, a traveling carriage including mechanism to selectively set up index-pins during the travel of the carriage in one direction, means operable during the return of the carriage to automatically restore the set-up pins, said restoring means being normally ineffective during the advance of the carriage, and means dependent upon movement of said carriage for rendering said restoring means effective.

16. In a perforating machine, the combination of normally inoperative punch-operating index-pins, a traveling carriage including mechanism to selectively set up index-pins during the travel of the carriage in one direction, and means rendered operable by an advance movement of the carriage at the end of a pin-setting operation to automatically restore the set-up pins when the direction of carriage travel is reversed.

17. In a perforating machine, the combination of a frame including normally inoperative punch-operating index-pins, a carriage on the frame to travel in two directions, mechanism carried by the carriage to selectively set up index-pins during the travel of the carriage in one direction, normally inoperative mechanism on the carriage to restore the set-up pins during the travel of the carriage in a reverse direction, and means on the frame to automatically control the pin-restoring mechanism.

18. In a perforating machine, the combination of a frame including normally inoperative punch-operating index-pins, a carriage on the frame to travel in two directions, mechanism carried by the carriage to selectively set up index-pins during the travel of the carriage in one direction, normally inoperative mechanism to restore the set-up pins during the travel of the carriage in a reverse direction, and means on the frame coacting with the advancing carriage for automatically conditioning the pin-restoring mechanism for action.

19. In a perforating machine, the combination of a stationary frame including punches and normally inoperative punch-selecting index-pins, a carriage on the frame to travel in two directions relatively to the index-pins, mechanism carried by the carriage to selectively and progressively set up index-pins during the travel of the carriage in one direction, normally inoperative mechanism on the carriage to progressively restore the set-up pins during the travel of the carriage in a reverse direction, and means on the frame rendered operative by the advance movement of the carriage to automatically control said pin-restoring mechanism during the reverse travel of the carriage.

20. In a perforating machine, the combination of a stationary frame including punches and normally inoperative punch-selecting index-pins, a carriage on the frame to travel in two directions relatively to the index-pins, mechanism carried by the carriage to selectively and progressively set up index-pins during the travel of the carriage in one direction, normally inoperative mechanism on the carriage to progressively restore the set-up pins during the travel of the carriage in a reverse direction, adjustable means on the frame operative by the advance movement of the carriage to automatically render the pin-restoring mechanism operative, and other means on the frame operative by the return movement of the carriage to automatically render said pin-restoring mechanism inoperative.

21. In a perforating machine, the combination of punches and normally inoperative punch-selecting index-pins, a feedable traveling carriage including mechanism to selectively and progressively set up index-pins during the travel of the carriage, and means dependent upon the carriage travel and rendered operable during the feeding of the carriage in a pin-setting direction to automatically and progressively restore the set-up pins when the direction of carriage travel is reversed.

22. In a perforating machine, the combination of punches and normally inoperative punch-selecting index-pins, a feedable traveling carriage including mechanism to selectively and progressively set up and accumulate the set-up index-pins during the feeding of the carriage, and mechanism normally inoperative to restore the accumulated set-up pins, said last-named mechanism automatically effective at the end of a pin-setting operation to progressively release the accumulation of set-up pins row by row when the direction of carriage travel is reversed.

23. In a combined typewriting and perforating machine, the combination of typing elements including a carriage and a carriage-feeding mechanism, a perforating mechanism including normally inoperative punch-operating index-pins, key-actuated means to selectively set certain index-pins at each typing operation, and means automatically caused to be conditioned and set by the carriage-advance movement at a predetermined line-end position to restore the set-up pins during the carriage return movement.

24. In a combined typewriting and perforating machine, the combination of typing elements including a carriage and a carriage-feeding mechanism, a perforating mechanism including normally inoperative punch-operating index-pins, key-actuated means to selectively set certain index-pins at each typing operation, mechanism automatically caused to be conditioned and set by the carriage-advance movement at a predetermined line-end position to restore the set-up pins during the carriage return movement, and means effective at the end of the carriage return movement to disable the pin-restoring mechanism.

25. In a combined typewriting and perforating machine, the combination of typing mechanism including both numeral and alphabet keys, perforating mechanism including punch-operating index-pins, index-pin-setting devices, and electro-mechanical means actuated by said keys to selectively operate the pin-setting devices in a manner that is descriptive of any character typed.

26. In a combined typewriting and perforating machine, the combination of perforating mechanism including card-guides fixed to the perforating elements, typing mechanism including a traveling carriage and a revoluble platen, a card-holder carried by the platen, a fixed stop to arrest the rotation of the platen at a uniform card-receiving and card-delivering position, and a paper-table on the carriage to guide the card from the card-holder directly to the guides of the perforating machine.

27. In a combined typewriting and perforating machine, the cambination of perforating mechanism including card-guides fixed to the perforating elements, typing mechanism including a traveling carriage and a revoluble platen, a card-holder carried by the platen, a fixed stop to arrest the rotation of the platen at a uniform card-receiving and card-delivering position, and a paper-table on the carriage disposed to guide a card directly into the card-holder or directly from the card-holder into the guides of the perforating machine.

28. In a combined typewriting and perforating machine, the combination of perforating mechanism including card-guides fixed to the perforating elements, typing mechanism including a carriage capable of letter-feeding and return travel and a revoluble platen, a card-holder carried by the platen, a fixed stop to arrest the rotation of the platen at a determined card-receiving and card-delivering position, and a paper-table on the carriage disposed to guide a card directly into the card-holder or directly from the card-holder into the guides of the perforating machine, said perforating mechanism and said typing mechanism being disposed relatively to one another, so that the card may be thus directly guided from the card-holder to said perforating-machine guides when the typewriter-carriage is at the end of its letter-feeding travel.

29. The combination with numeral typing keys and a carriage controlled thereby, of a card-perforating mechanism including digit-selecting devices, controlling trains connecting said typing keys to said selecting devices, said card-perforating mechanism also including a carriage, a driving train mechanically connecting said carriages to enable said typing keys to have direct control over said perforating carriage for effecting the step-by-step movements thereof, and power-driven mechanism operative for returning both carriages and without removing the hands from the keyboard.

30. The combination with numeral typing keys and a carriage controlled thereby, of a card-perforating mechanism including digit-selecting devices, controlling trains connecting said typing keys to said selecting devices, said card-perforating mechanism also including a carriage, a driving train mechanically connecting said carriages to enable said typing keys to have direct control over said perforating carriage for effecting the step-by-step movements thereof, and carriage-tabulating mechanism operative to release and arrest both carriages at predetermined columnar positions and without removing the hands from the keyboard.

31. The combination with numeral typing keys and a carriage controlled thereby, of a card-perforating mechanism including digit-selecting devices, controlling trains connecting said typing keys to said selecting devices, said card-perforating mechanism also including a carriage, a driving train mechanically connecting said carriages to enable said typing keys to have direct control over said perforating carriage for effecting the step-by-step movements thereof, carriage-tabulating mechanism operative to release and arrest both carriages at predetermined columnar positions and without removing the hands from the keyboard, and carriage-back-spacing mechanism operative to back-space both carriages from said columnar positions to denominational positions within the column and without removing the hands from the keyboard.

32. In a combined typewriting and card-punching machine, the combination with a card-carriage and a punch-selecting carriage, of typing keys mechanically connected to effect letter-spacing of the card-carriage for letters and simultaneously effect denominational spacing for the punch-selecting carriage for perforating the card.

33. In a combined typewriting and card-punching machine, the combination with a card-carriage and a punch-selecting carriage, of typing keys mechanically connected to effect double letter-spacing distances for the card-carriage in typing letters and simultaneously effect single punch-spacing distances for the punch-selecting carriage for perforating the card.

34. In a combined typewriting and card-punching machine, the construction as disclosed including a card-carrying typing carriage feedable in a letter-space direction as each character is typed upon the card, a plurality of stationary punches normally inoperative to perforate the card, a carriage feedable relatively to the stationary punches, punch-selecting elements feedable with said last carriage and operatively connected to the typing mechanism to predetermine a punch-operating position each time a character is typed upon the card and progressively accumulate punch-operating positions as the typing of the card-line progresses, and means for connecting the card-carriage with the punch-selecting carriage effective to reverse the feeding direction of the two carriages so that, in typing a line upon the card, the direction of card-feed will be from right to left, and the progressive setting up of the punches will be in a direction from left to right to enable the typed card to be removed from the card-carriage face up and transferred face up to the punches to be perforated.

35. In a combined typewriting and card-punching mechanism, the organization as disclosed including a typewriter-carriage having a rotatable platen with means for feeding a front-inserted card rearwardly to present a line-position thereon to the typing position and feedable with said carriage in a letter-space direction as each character is typed upon the card, a plurality of stationary punches normally inoperative to perforate the card, a carrier feedable relatively to the stationary punches, punch-selecting elements operatively mounted upon said carrier and connectible with the typing mechanism to predetermine punch-operating positions each time a character is typed upon the card and progressively accumulate punch-operating positions as the typing of the card-line progresses, and means operatively connecting the typewriter-carriage with the punch-selecting carrier enabling said carriage and said carrier to feed uniform spacing distances in opposite directions, and, at the end of a line-typing operation, establishing a platen-delivery position for the typed card that will align to the fixed receiving position for the card under the punches and be subsequently perforated.

36. In a combined typewriting and card-punching mechanism, the organization as disclosed including a typewriter-carriage having a rotatable platen with means for feeding a front-inserted card rearwardly to present a line-position thereon to the typing position and feedable with said carriage in a letter-space direction as each character is typed upon the card, a plurality of stationary punches normally inoperative to perforate the card, a carrier feedable relatively to the stationary punches, punch-selecting elements operatively mounted upon said carrier and connectible with the typing mechanism to predetermine punch-operating positions each time a character is typed upon the card and progressively accumulate punch-operating positions as the typing of the card-line progresses, means operatively connecting the typewriter-carriage with the punch-selecting carrier enabling said carriage and said carrier to feed uniform spacing distances in opposite directions, and, at the end of a line-typing operation, establishing a platen-delivery position for the typed card that will align to the fixed receiving position for the card under the punches and be subsequently perforated, and power-driven mechanism operatively connected to effect a punch-perforating movement of the card.

37. In a combined typewriting and card-punching mechanism, the organization as disclosed including a typewriter-carriage having a rotatable platen with means for feeding a front-inserted card rearwardly to present a line-position thereon to the typing position and feedable with said carriage in a letter-space direction as each character is typed upon the card, a plurality of stationary punches normally inoperative to perforate the card, a carrier feedable relatively to the stationary punches, punch-selecting elements operatively mounted upon said carrier and connectible with the typing mechanism to predetermine punch-operating positions each time a character is typed upon the card and progressively accumulate punch-operating positions as the typing of the card-line progresses, means operatively connecting the typewriter-carriage with the punch-selecting carrier enabling said carriage and said carrier to feed uniform spacing distances in opposite directions, and, at the end of a line-typing operation, establishing a platen-delivery position for the typed card that will align to the fixed receiving position for the card under the punches and be subsequently perforated, power-driven mechanism operatively connected to effect a punch-perforating movement of the card, and other power-driven mechanism operatively connected to return the typewriter-carriage and the punch-selecting carrier to their normal positions.

38. In a combined typewriting and card-punching mechanism, the organization as disclosed including a typewriter-carriage having a rotatable platen with means for feeding a front-inserted card rearwardly to present a line-position thereon to the typing position and feedable with said carriage in a letter-space direction as each character is typed upon the card, a plurality of stationary punches normally inoperative to perforate the card, a carrier feedable relatively to the stationary punches, punch-selecting elements operatively mounted upon said carrier and connectible with the typing mechanism to predetermine punch-operating positions each time a character is typed upon the card and progressively accumulate punch-operating positions as the typing of the card-line progresses, means operatively connecting the typewriter-carriage with the punch-selecting carrier enabling said carriage and said carrier to feed uniform spacing distances in opposite directions, and, at the end of a line-typing operation, establishing a platen-delivery position for the typed card that will align to the fixed receiving position for the card under the punches and be subsequently perforated, power-driven mechanism operatively connected to effect a punch-perforating movement of the card, and other power-driven mechanism operatively connected to return the typewriter-carriage and the punch-selecting carrier to their normal positions, and automatically effect the release of the key-selected card-punches during the carriage-returning movement.

39. The combination with a typewriting mechanism including type-keys and a letter-feeding carriage operated by said keys, of a card-punching mechanism including punch-indexing devices selectively settable by said keys, means directly under the control of the typewriter-carriage for determining the denomination of the punch-indexing device to be set by the selected key, and means operable after the operation of the typewriter-keys, for punching a card consonantly with the indexing devices set by said keys.

ALFRED G. F. KUROWSKI.